United States Patent [19]
Ferguson et al.

[11] 3,952,598
[45] Apr. 27, 1976

[54] PRESSURE GAUGE CONSTRUCTION

[75] Inventors: Walter James Ferguson, Middlebury; Ronald Joseph Luich, Shelton, both of Conn.

[73] Assignee: Dresser Industries, Inc., Dallas, Tex.

[22] Filed: July 28, 1975

[21] Appl. No.: 599,507

[52] U.S. Cl. ................................ 73/415; 73/418; 73/431
[51] Int. Cl.² ........................................ G01L 7/04
[58] Field of Search ............ 73/418, 411, 412, 431, 73/300, 413, 414, 415, 416, 417, 368.6, 396

[56] References Cited
UNITED STATES PATENTS

| | | | |
|---|---|---|---|
| 2,701,964 | 2/1955 | Argabrite | 73/431 |
| 3,213,688 | 10/1965 | Huston | 73/418 |
| 3,338,103 | 8/1967 | Lohrs et al. | 73/431 |

*Primary Examiner*—Donald O. Woodiel
*Attorney, Agent, or Firm*—Daniel Rubin

[57] ABSTRACT

A pressure gauge of small size and type suitable for fire extinguisher use. Comprising the gauge is a dial plate secured in keyed registration onto the front face of the casing. A tubular stem extending laterally from the inside face of the viewing crystal is axially slotted to embrace a radial portion of a wound Bourdon tube supporting a pointer opposite the dial plate. Rotating the crystal prior to securing it to the casing enables the tube slot to zero position the pointer at the zero graduation on the dial plate. When secured to the casing the distal end of the crystal stem compresses an O-ring washer for effecting an internal pressure seal between the casing and Bourdon tube thereat.

10 Claims, 8 Drawing Figures

PRESSURE GAUGE CONSTRUCTION

BACKGROUND OF THE INVENTION

1. The field of art to which the invention relates comprises the art of measuring and testing as related to fluid pressure gauges.

2. Pressure gauges enjoy very extensive commercial and industrial use and are consequently regarded as high production items. Because of such wide use, they are supplied by a plurality of manufacturers and sold in very price conscious competition. Each manufacturer instinctively strives to reduce product costs by improvements, however marginal, which reduce labor and/or materials that can contribute to cost savings in the end product. Commonly affording pressure sensitivity in the pressure gauge is a Bourdon tube of a pressure-tight construction having a free end displaceably movable in response to pressure changes supplied at its inlet. To translate tube movement into values of pressure a pointer is supported on its free end which then moves with the tube relative to a calibrated dial plate. For ensuring readout accuracy, provision is usually made either during or after assembly for locating the pointer at the zero position of the dial.

In a conventional construction, the inlet end of the Bourdon tube is secured to the casing and the dial plate is rotatably positioned to effect the zero adjustment. This arrangement is most suitable where ultimate mounting of the gauge affords flexibility in orientation on the equipment for convenient viewing. In instances in which such flexibility is lacking, i.e., where the gauge casing is somehow keyed to the equipment, it is necessary to similarly key the dial plate thereby precluding its rotation for the purpose of zero adjustment. Under those circumstances, it is common to rotate the coil/pointer in effecting the zero calibration. In manufacturing low cost high volume production of the latter type for the fire extinguisher market, the required time and labor to effect zero adjustment has been regarded as disproportionate to the overall value of the finished product. Despite recognition of the problem, a ready solution has not heretofore been known.

SUMMARY OF THE INVENTION

The invention relates to pressure gauges and particularly to small low cost gauges suitable for use on fire extinguishers or the like. More specifically, the invention relates to a pressure gauge having a construction and assembly procedure therefor affording a more efficient zero adjustment compared to constructions and procedures previously employed.

The foregoing is achieved by first forming two separate sub-assemblies which are then joined together in registry to form the finished product. A first sub-assembly is comprised of a cup-like casing having a tubular rearward socket stem for mounting onto receiving equipment and in which the inlet end of a Bourdon tube is to be contained. A dial plate having appropriate pressure graduations is supported in a rotatably preset keyed orientation on the inside face of the casing. The second sub-assembly is comprised of a cup-like viewing crystal affording a peripherally matched interfit with the casing and includes a laterally extending tubular stem integrally formed at a central location on its inside face. The crystal stem receives the inlet end of a multi-coiled Bourdon tube from an axial location outward thereof and has an axial slot in its side wall embracing the Bourdon tube extending radially from its inlet axis. By virtue of the embracing relation afforded between stem slot and tube, the Bourdon tube and its supporting pointer are rotatably captured by the crystal.

With the sub-assemblies thus formed they are brought together with the inlet of the Bourdon tube loosely placed into the socket stem of the casing. Rotating the crystal in this relation automatically displaces the pointer relative to the dial plate. On zero adjustment being achieved, the crystal and casing are permanently joined about their mutual peripheries completing fabrication while enabling the distal end of the crystal stem to compress a gasket for effecting a pressure seal thereat.

It is therefore an object of the invention to provide an improved construction for a pressure gauge which substantially simplifies zeroing calibration thereof.

It is a further object of the invention to provide a novel construction for a pressure gauge that significantly enhances the efficiency and economics for effecting zero adjustment as compared to prior art structures and procedures.

It is a yet further object of the invention to effect the previous objects with relatively inexpensive features of construction and a minimum number of parts rendering it particularly advantageous for use on relatively small mass produced gauges.

It is a still further object of the invention to provide a novel method of manufacturing a pressure gauge in accordance with the foregoing objects.

BRIEF DESCRIPTION OF THE DRAWINGS

FIG. 4 is a sectional view as seen substantially along the lines 4—4 of FIG. 2;

Referring now to FIGS. 1-5 of the drawings, the gauge construction in accordance herewith comprises a more or less cup-shaped casing 10 having a peripheral flange 11 and a laterally rearward extending socket stem 12 adapted for aperture mounting into a fluid system with which the gauge is to be utilized. Stem 12 includes a central tubular passage 14 in which the inlet end 15 of a multi-coiled Bourdon tube 16 is received. Supported about boss 17 against the inside face of the casing is a dial plate 19 secured keyed against rotation by means of a radially extending dial key 23 in aligned registry with mounting key 24. The movable or displaceable end of the Bourdon tube supports a radially extending pointer 18 which is displaceable in the course of operation relative to graduations 20 on the dial plate that includes a zero position 21.

Figure 1:
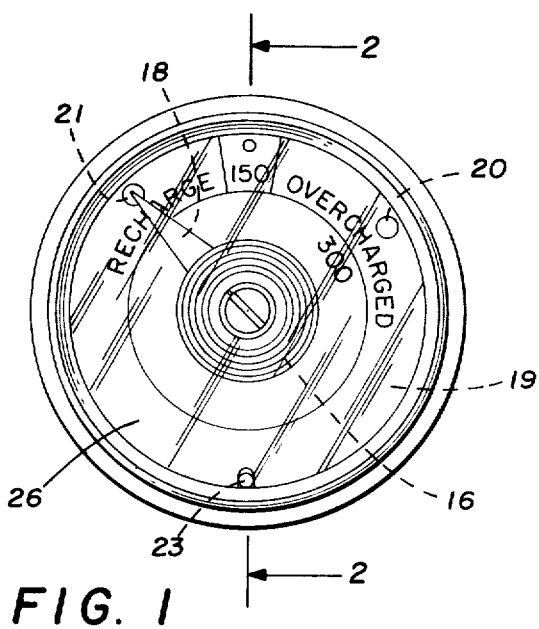
FIG. 1 is a top plan view of a gauge constructed in accordance herewith.
Figure 3:
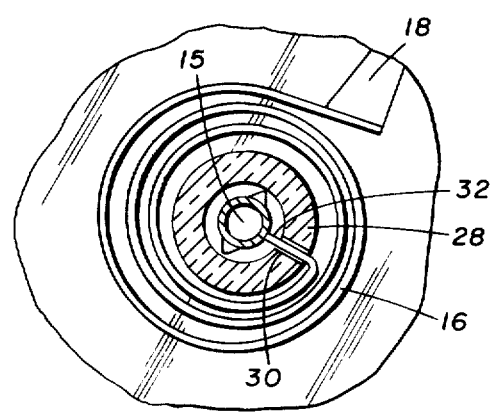
FIG. 3 is a sectional view as seen substantially along the lines 3—3 of FIG. 2.

Opposite dial plate 19 as to cooperate with casing 10 for hermetically enclosing Bourdon tube 16 is a transparent cup-like viewing crystal 26 adapted to interfit with shoulder step 25 of the casing along the exposed end face of its peripheral flange 27. Integrally extending laterally inward from the inside face of crystal 26 is a tubular stem 28 receiving the inlet portion 15 of Bourdon tube 16. Included in a side wall of stem 28 is an axial slot 30 substantially embracing a radial portion 32 of the Bourdon tube connecting the inlet and coil portions thereof. Mounted on tube inlet 15 at the under distal end 29 of crystal stem 28 is an annular washer 34 compressing an O-ring gasket 36 against a shoulder 38 of the casing for effecting a pressure-tight seal thereabout. Washer 34 prevents extrusion of gasket 36 into the space between coil inlet 15 and the bore of stem 28. A tape 40 externally supported overlying casing aperture 42 provides relief in the event of overpressure buildups within the case enclosure. Tape 40 may, for example, comprise a finely pierced elastomeric tape of a type disclosed in U.S. Pat. No. 1,865,764 for repeated relief or may alternatively comprise an unpierced tape suitably bonded to casing 10. In a preferred form both casing 10 and crystal 26 are of a molded plastic polycarbonate composition affording a corrosion safe construction respecting the equipment mount with which it will ultimately be utilized. The frontal thickness of crystal 26 is adjusted to minimize axial motion of stem 28 under pressure.

In fabricating the gauge hereof, two sub-assemblies are first formed, one of which consists of casing 10 supporting dial plate 19 positioned on key 23. The other sub-assembly consists of crystal 26 containing pointered Bourdon tube 16 in position with the radial portion 32 thereof extending through stem slot 30 and its inlet portion 15 projecting beyond the stem end 29 into casing socket 12. Contained on the rearward projection of tube portion 15 is an annular washer 34 and uncompressed gasket 36. With both sub-assemblies thus formed, the crystal assembly is positioned opposite and spaced from the casing assembly as generally shown dashed in FIG. 2 with tube inlet 15 penetrating loosely into passage 14.

With the sub-assemblies still generally separated, crystal 26 is rotated for stem slot 30 to angularly displace the Bourdon tube and pointer 18 until the latter registers with zero position 21 on dial plate 22. On registration being achieved, the crystal and casing are brought together with the face of crystal surface 27 contacting casing shoulder 25 at which time they are joined by a fusion weld 44 to complete fabrication. Preferably, weld 44 extends peripherally continuous about the mutual surfaces thereof for water tightness. Once joined, stem end 29 acting against washer 34 effectively compresses gasket 36 into its sealing relation thereabout. Since zero adjustment is obtained in the course of assembly by mere rotation of crystal 26 whereby the position of slot 30 essentially defines the initial position of pointer 18, the effort involved in effecting that adjustment is absolutely minimal as compared to similar purpose procedures of the prior art enabling a significant cost saving to be realized in the performance thereof.

Figure 2:
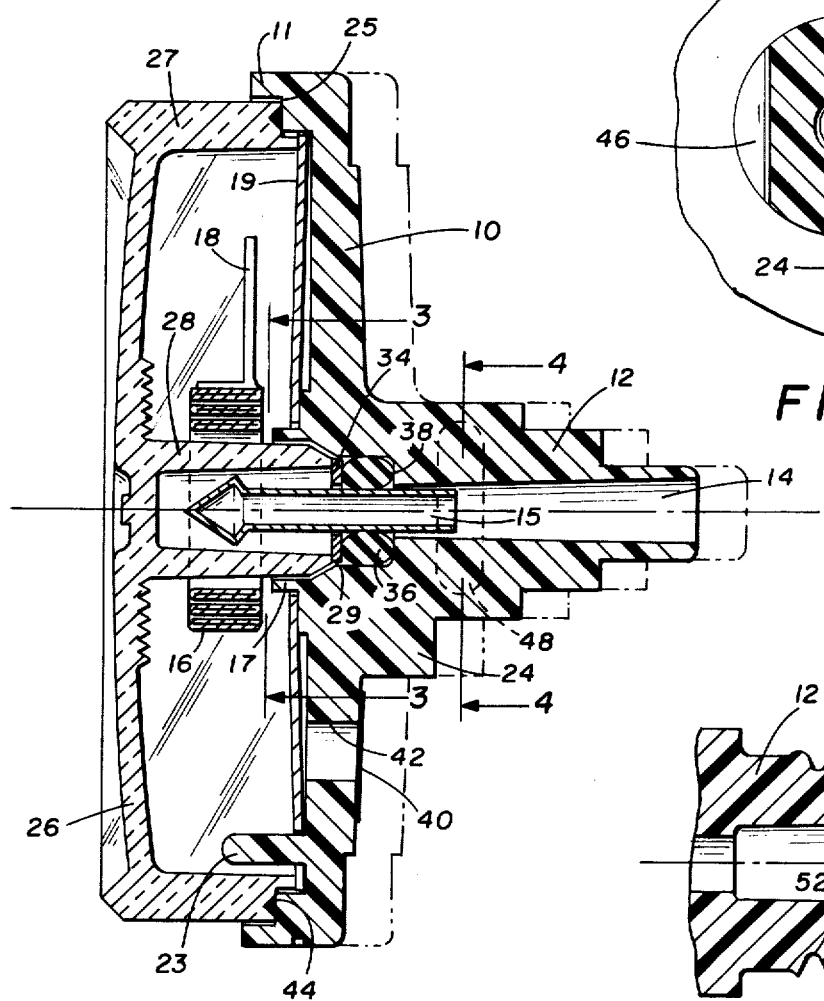
FIG. 2 is an enlarged sectional view as seen substantially along the lines 2—2 of FIG. 1 for an all plastic case construction.
Figure 5:
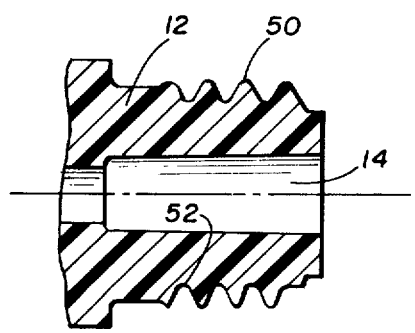
FIG. 5 is a fragmentary sectional view of an alternative stem mounting construction to that illustrated in the embodiment of FIG. 2.

For the embodiment of FIG. 2, casing stem 12 comprises a step down shoulder construction, the smallest of which is adapted to receive an O-ring gasket not shown. Parallel slots 46 on opposite sides of stem 12 receive a U-shaped retaining pin likewise not shown. In the alternative socket stem 12 construction of FIG. 5, the casing is adapted for threaded mount for which threads 50 are provided. Preferably, the normally sharp thread root is replaced with a fillet or radius 52 to minimize the likelihood of breakage thereat.

Figure 6:
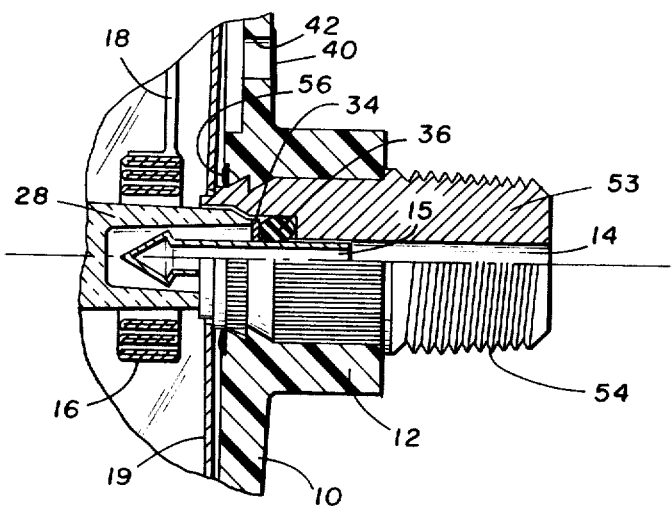
FIG. 6 is an alternative construction utilizing a metal casing socket.
Figure 7:
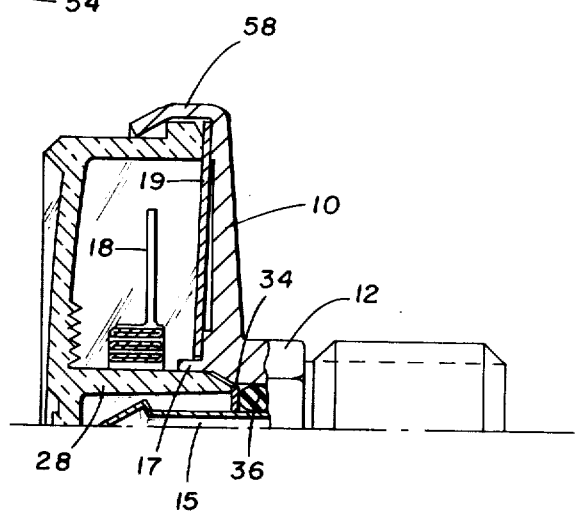
FIG. 7 is an alternative construction utilizing a metal casing.
Figure 8:
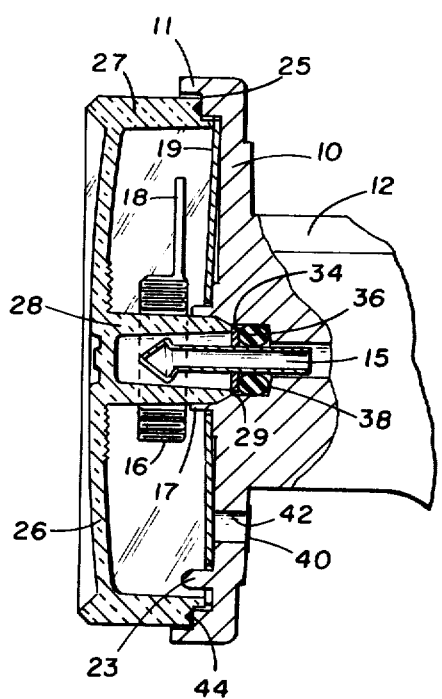
FIG. 8 is an alternative construction utilizing a base comprising a permanent component of the receiving equipment.

The alternative embodiment of FIG. 6 includes a metal socket 53 conventionally threaded at 54 and received within casing stem 12. A suitable sealant may optionally be applied at 56. For the embodiment of FIG. 7, an entirely metal casing 10 and socket stem 12 are employed and which may, for example, secure crystal 26 via a wraparound flange 58 as disclosed, for example, in U.S. Pat. No. 3,630,089. In the embodiment of FIG. 8, casing 10 comprises the actual valve of a fire extinguisher supporting dial plate 19 and to which only the crystal assembly supra need be supplied for joinder thereto at 44 to complete fabrication of the gauge.

By the above description, there has been disclosed a novel gauge construction lending itself to a substantially more efficient calibration of zero adjustment as compared to previous similar purpose techniques available for that purpose. By virtue of a relatively simple yet effective construction, a significant cost saving can be realized contributing to an overall cost saving in the manufacture of the finished product. Since such items, particularly in small sizes for fire extinguisher gauges, are very cost competitive, the construction hereof substantially enhances the economic position of such gauges in the competitive environment in which it must contend for sales.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A pressure gauge comprising:
   a. a casing having a hollow stem for mounting into a receptacle of a pressure source with which the gauge is to be utilized;
   b. a dial plate having graduated pressure indicia and supported secured against rotation on a radially extending inward surface of said casing;
   c. a Bourdon tube having a pressure inlet supported in said casing stem and including a pointer supported on its free end opposite the indicia on said dial plate; and
   d. a viewing crystal cooperating with said casing to enclose said pointer and dial plate in visible relation therethrough, said crystal including means operably defining an initial position of said pointer relative to the indicia on said dial plate.

2. A pressure gauge according to claim 1 in which said crystal including means comprises a tubular stem extending laterally inward from said crystal as to rotationally embrace a portion of said Bourdon tube extending therethrough.

3. A pressure gauge according to claim 2 in which said crystal stem extends from a central location on said crystal and includes an axial slot defined in the tubular wall thereof rotationally embracing a radially extending portion of said Bourdon tube.

4. A pressure gauge according to claim 3 including annular gasket means supported on said Bourdon tube near the inlet end thereof beyond the distal end of said crystal stem, a pocket defined in said casing receiving said gasket means and the distal end of said crystal stem in cooperation with said casing pocket are effective to compress said gasket into a pressure-tight seal between the exterior surface of said Bourdon tube and the interior surface of the casing stem thereat.

5. A pressure gauge according to claim 4 in which said crystal and casing include a mutual interfit about their peripheries at which they are secured together against axial separation.

6. A pressure gauge according to claim 5 including pressure relief means operably effective at a predetermined overpressure within said enclosure for venting the overpressure to atmosphere.

7. A pressure gauge sub-assembly comprising the combination of:
   a. a Bourdon tube having a pointer supported on its free end; and
   b. a viewing crystal containing said Bourdon tube and adapted to cooperate with a casing to effect an enclosure therefor, said crystal including means rotationally embracing a portion of said Bourdon tube extending therethrough.

8. A pressure gauge sub-assembly according to claim 7 in which said crystal including means comprises a tubular stem extending laterally inward from a central location on said crystal and includes an axial slot defined in the tubular wall thereof rotationally embracing a radially extending portion of said Bourdon tube.

9. A pressure gauge sub-assembly according to claim 8 including annular gasket means supported on said Bourdon tube near the inlet end thereof beyond the distal end of said crystal stem.

10. A method of manufacturing a pressure gauge comprising the steps of:
   a. forming a first sub-assembly comprising a casing having a hollow stem for mounting into a receptacle of a pressure source with which the gauge is to be utilized and a dial plate having graduated pressure indicia supported secured against rotation on a radially extending inward surface of said casing;
   b. forming a second sub-assembly comprising a Bourdon tube having a pointer supported on its free end and a viewing crystal containing said Bourdon tube and including means rotationally embracing a portion of said Bourdon tube extending therethrough;
   c. while supporting said sub-assemblies superposed with the Bourdon tube of said second sub-assembly opposite the dial plate of said first sub-assembly, relatively rotating said sub-assemblies until the pointer of said Bourdon tube is in registry with predetermined indicia on said dial plate; and
   d. after effecting said pointer registry securing said sub-assemblies together to form an enclosure for said Bourdon tube while retaining said pointer registry.

* * * * *